United States Patent
O'Hagan

(10) Patent No.: US 6,357,995 B1
(45) Date of Patent: Mar. 19, 2002

(54) DEVICE FOR HANDLING ROD-LIKE ARTICLES, SUCH AS REBAR AND THE LIKE

(75) Inventor: Peter K. O'Hagan, Hamilton (CA)

(73) Assignee: Columbus McKinnon Corporation, Amherst, NY (US)

( * ) Notice: Subject to any disclaimer, the term of this patent is extended or adjusted under 35 U.S.C. 154(b) by 0 days.

(21) Appl. No.: 09/565,300

(22) Filed: May 4, 2000

(51) Int. Cl.[7] .......................... B66F 11/00; B65G 25/00; B65G 37/00; B65G 47/04; B65G 47/34

(52) U.S. Cl. ........................ 414/746.4; 414/745.9; 414/746.1; 198/463.5

(58) Field of Search .................. 414/745.9, 746.1, 414/746.4; 198/463.5, 459.4

(56) References Cited

U.S. PATENT DOCUMENTS

| | | | | |
|---|---|---|---|---|
| 3,618,741 A | * | 11/1971 | Berndt ................. | 198/463.5 X |
| 3,795,302 A | * | 3/1974 | Schoppee ............ | 198/463.5 X |
| 3,952,856 A | * | 4/1976 | Kurzweil et al. .... | 198/459.4 X |
| 4,265,357 A | * | 5/1981 | Amberg et al. ...... | 198/459.4 X |
| 4,566,583 A | * | 1/1986 | Schneider ............ | 198/459.4 X |
| 4,660,708 A | * | 4/1987 | Willerding ........... | 198/459.4 X |
| 4,896,646 A | * | 1/1990 | Kahelin et al. ...... | 198/463.5 X |
| 4,930,616 A | * | 6/1990 | Lindberg ............. | 198/463.5 X |
| 5,119,930 A | * | 6/1992 | Stelter ................. | 198/463.5 X |

* cited by examiner

Primary Examiner—Christopher P. Ellis
Assistant Examiner—Gene O. Crawford
(74) Attorney, Agent, or Firm—Phillips, Lytle, Hitchcock, Blaine & Huber LLP

(57) ABSTRACT

A device (20) is adapted to move an elongated object (21), such as rebar, from a first location (22) to a second location (23). The device includes an object-supporting surface (24), such as a conveyor; a plurality of stops (25) extending in a direction away from the surface; at least one hold-down (26) spaced from the surface and the stop. The first (22) location is arranged between the surface, stop and hold-down. A mechanism (28) is adapted to pick up an object positioned at the first location and to move the object along an orbital path (46) to a second location (23). Before arriving at the second location, the object may be counted and/or separated from other objects.

7 Claims, 4 Drawing Sheets

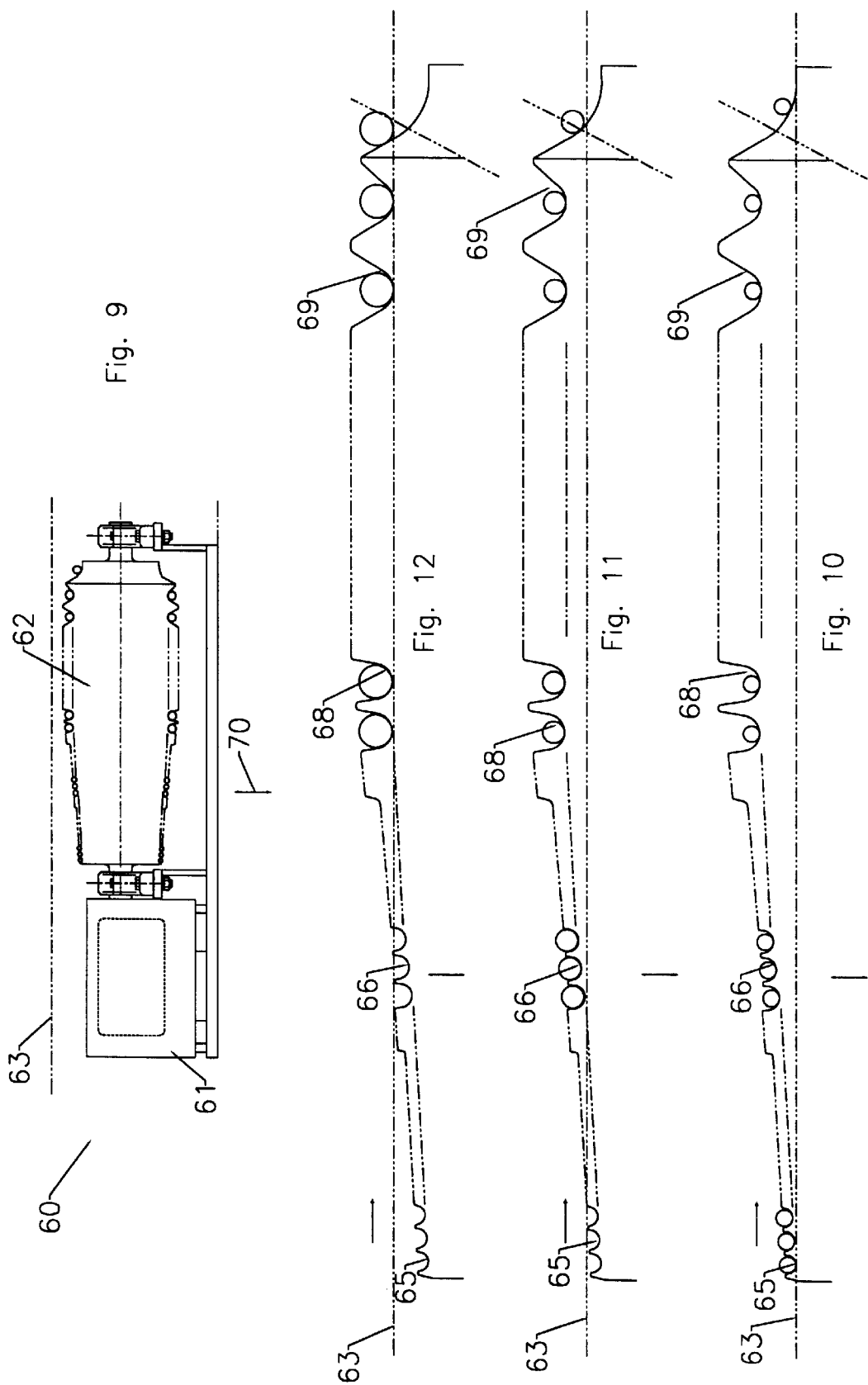

DEVICE FOR HANDLING ROD-LIKE ARTICLES, SUCH AS REBAR AND THE LIKE

TECHNICAL FIELD

The present relates generally to devices for handling elongated rod-like objects, such as reinforcing rod ("rebar") used in concrete construction, and, more particularly, to an improved device for moving, spacing and/or counting such objects as they are translated from a first location toward a second location.

BACKGROUND ART

Reinforcing rod used in concrete construction is commonly called "rebar". These rods are normally shipped from a steel mill to a work site in tied bundles. When the bundles are untied, it would be desirable to have the individual lengths be readily separable from one another, and not be intertwined or "jackstrawed". However, rebar is typically shipped in from about twelve to about sixty foot lengths. At these lengths, the rebar is relatively flexible owing to a large length-to-diameter ratio. Hence, unlike individual rigid strands of uncooked spaghetti when held in a bundle, it is very easy for the relatively-flexible rebar to become intertwined with one another. This is known as "jackstrawing". If a bundle of rebar is wrapped and shipped in this configuration, the individual bars may have a permanent set to them when the bundle is opened.

Accordingly, it would be generally desirable to have a bundle of rebar rods operatively arranged such that the individual rods are generally parallel to one another without being "jackstrawed". At the same, there is a continuing need for an improved counter for physically counting the number of items being wrapped in a particular bundle.

DISCLOSURE OF THE INVENTION

With parenthetical reference to the corresponding parts, portions or surfaces of the disclosed embodiment, merely for purposes of illustration and not by way of limitation, the present invention provides an improved device (20) that is adapted to move, separate and/or count elongated objects (21), such as rebar or the like, from a first location (22) to a second location (23).

The improved device broadly comprises a surface (24) for supporting the object, at least one stop (25) extending in a direction away from the surface, and at least one hold-down (26) spaced vertically from the surface and spaced horizontally from the stop. The first location is arranged between the surface, stop and hold-down. The improved device further includes a mechanism (28) that is adapted to selectively pick up an object (21) positioned at the first location (22) and to move it along an orbital path (46) toward a second location (23).

The surface (24) may, for example, be a conveyor that is operatively arranged to continuously urge the objects to move toward the first location. However, this is not invariable, and other types of object-supporting and object-moving mechanisms and configurations may be employed.

In the preferred embodiment, an optical counter (48) is used to physically count objects as they are moved along the orbital path from the first location to the second location. In the preferred embodiment, the orbital path is substantially elliptical. However, other shapes and configurations might alternatively be used.

Moreover, the improved device may include a separator (49) that is adapted to be selectively moved toward the object while the object is positioned somewhere on its orbital path, and may be selectively moved in a longitudinal direction relative to the object(s) to separate one of the objects from another, as when they are "jackstrawed".

In other aspect, the invention provides an improved device (60) that is adapted to move elongated objects from a first location to a second location. This device broadly comprises a surface (63) adapted to support an object; and a member (62) mounted for rotation about an axis and having an outer peripheral surface, a continuous helical groove (65, 66, 68, 69) extending into this member from its peripheral surface and adapted to convey objects from a first location toward a second location, the pitch of the helical groove increasing in a direction from the first location toward the second location; such that the device may be used to move objects from the first location to the second location and to increase the spacing therebetween.

In this form, the surface may be a conveyor adapted to convey objects toward the first location. In this event, the speed of axial translation of the objects along the device is greater than the surface speed of the conveyor.

Accordingly, the general object of the invention is to provide an improved device that is adapted to move an elongated rod-like object, such as rebar or the like, from a first location to a second location.

Another object is to provide an improved device for separating and counting elongated rod-like objects.

These and other objects and advantages will become apparent from the foregoing and ongoing written specification, the drawings, and the appended claims.

BRIEF DESCRIPTION OF THE DRAWINGS

FIG. 3 is a fragmentary detail view showing the orbital path with respect to the use of ⅜-inch diameter rods.

FIG. 4 is a fragmentary detail view showing the orbital path with respect to ¾-inch cylindrical rods.

FIG. 5 is a fragmentary detail view showing the orbital path with respect to 2-inch diameter rods.

FIG. 6 is a fragmentary detail view showing the orbital path with respect to 4-inch diameter cylindrical rods.

FIG. 9 is a schematic view of a second form of the separator.

FIG. 10 is a view of the outer surface of the separator shown in FIG. 9 with respect to ⅜-inch diameter cylindrical objects.

FIG. 11 is a schematic view generally similar to FIG. 10, for use in ½-inch diameter cylindrical objects.

FIG. 12 is a view generally similar to FIG. 10, and showing the improved device used in connection with ¾-inch diameter cylindrical objects.

DESCRIPTION OF THE PREFERRED EMBODIMENTS

Figure 1:
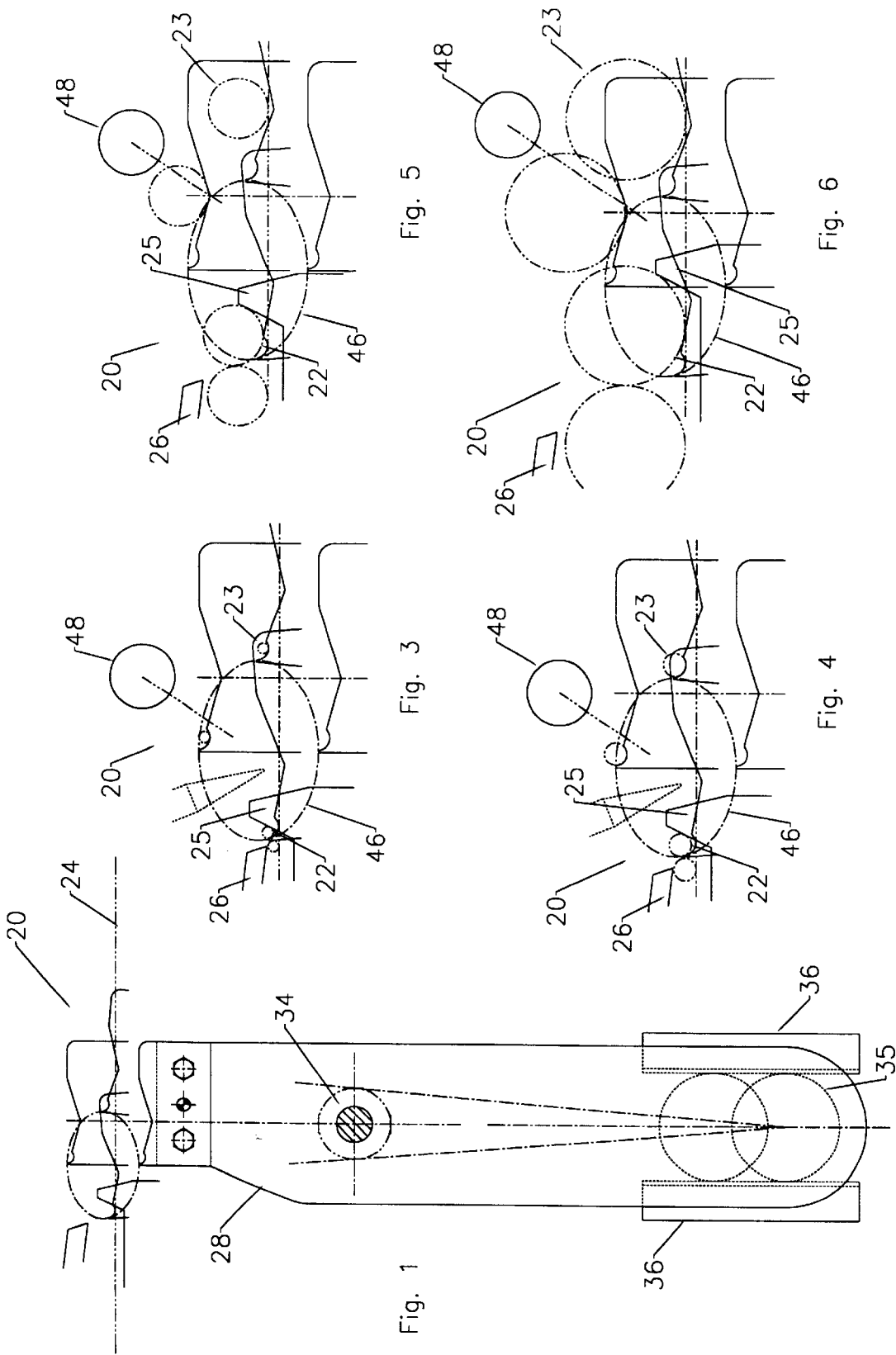
FIG. 1 is a fragmentary view, partly in section and partly in elevation, of a first preferred form of the improved device, this view showing the object-supporting conveyor surface, one stop, one hold-down and one orbital mechanism.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

Figure 2:
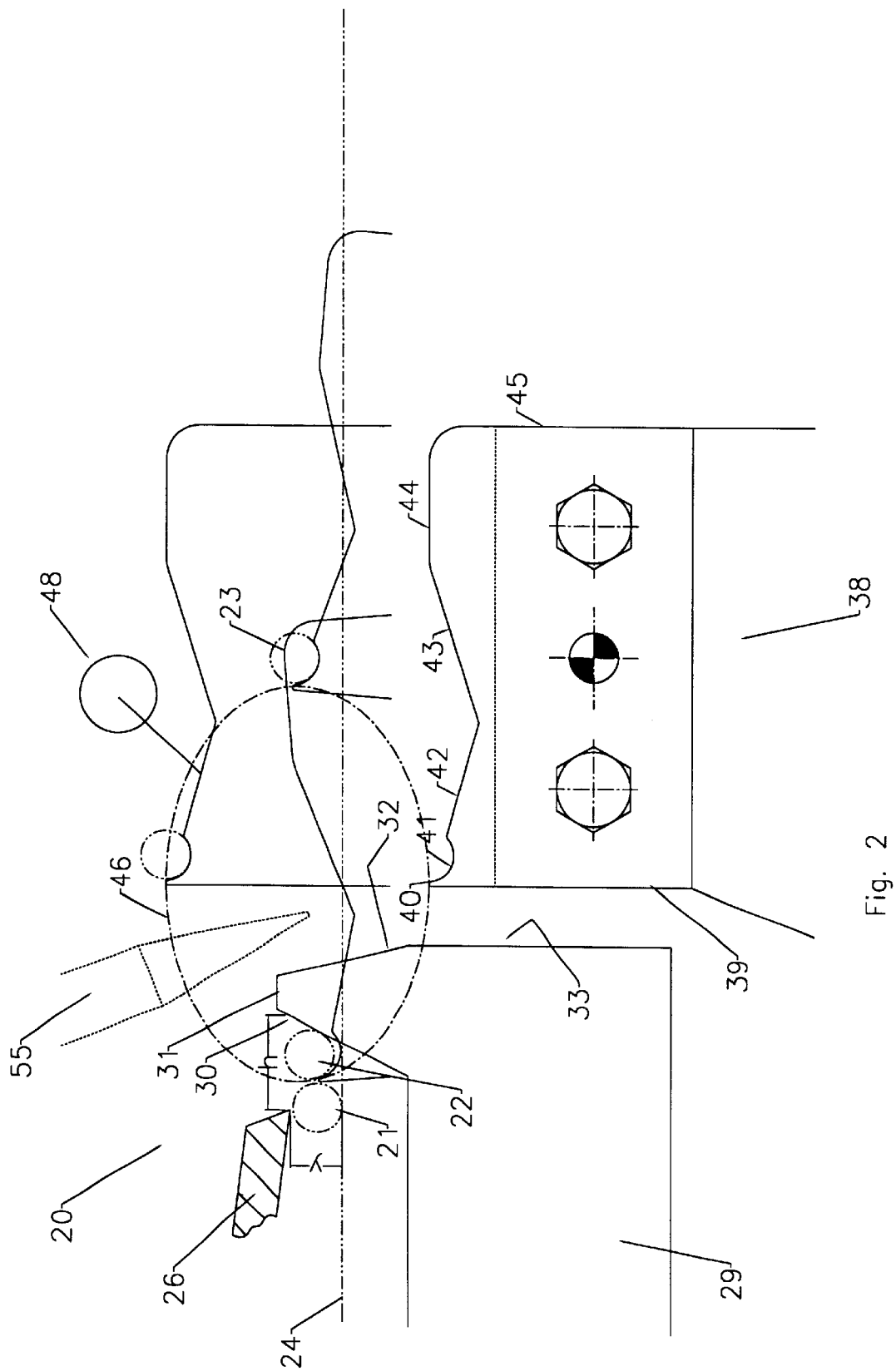
FIG. 2 is a greatly enlarged fragmentary detail view showing a stop, a hold-down, and the upper marginal end portion of the orbital mechanism.
Figure 8:
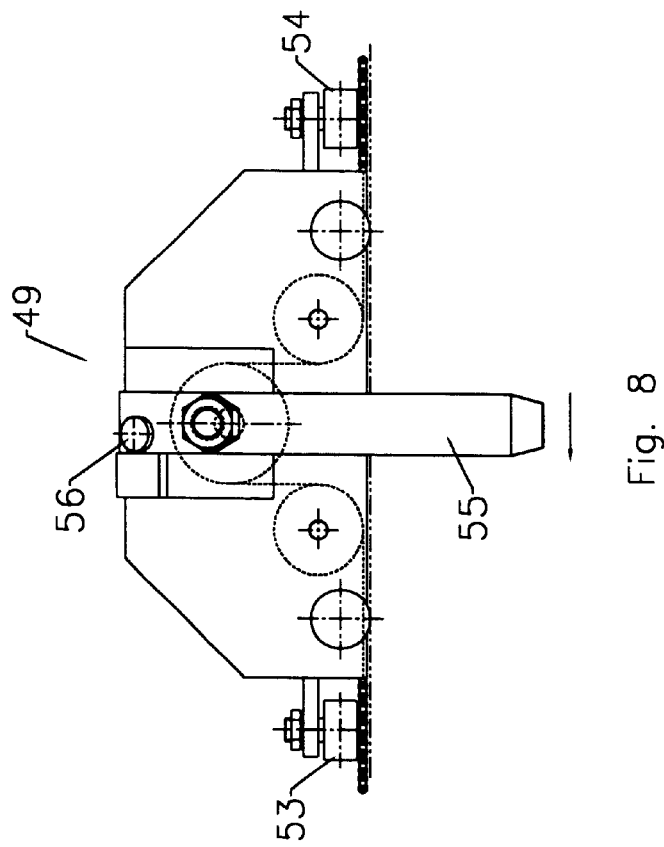
FIG. 8 is a fragmentary longitudinal view of the separator shown in FIG. 7.
Figure 7:
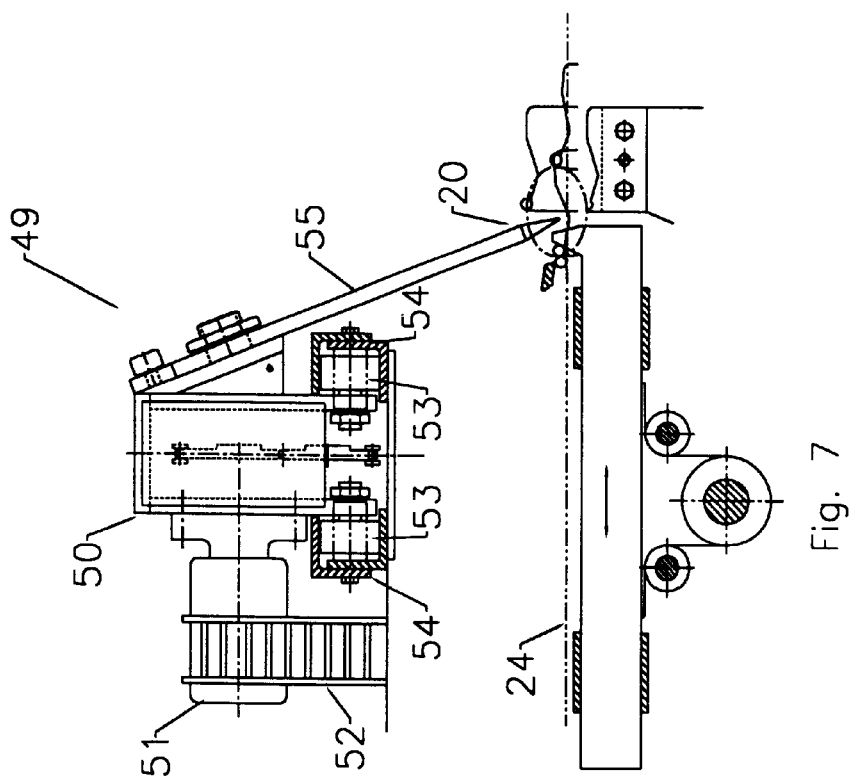
FIG. 7 is a transverse view somewhat similar to FIG. 1, but showing the separator as being mounted for movement relative to the objects.

Referring now to the drawings, and, more particularly, to FIGS. 1–6 thereof, the present invention broadly provides, in one aspect, an improved device, generally indicated at 20, that is adapted to move an elongated object, such as a rod, individually indicated at 21, from a first location, generally indicated at 22 in FIG. 2, to a second location, such as indicated at 23 in FIG. 2. The improved device broadly comprises an object-supporting surface, generally indicated at 24; a plurality of spaced stops, severally indicated at 25, extending in a direction away from the surface; a plurality of spaced hold-downs, severally indicated at 26, spaced from the surface and stop; and a plurality of spaced mechanisms, severally indicated at 28, operatively arranged to selectively pick up an object positioned at the first location and to move the object along an orbital path to a second location.

In the preferred embodiment, surface 24 is the upper surface of a load-bearing conveyor that moves horizontally from left to right. However, in other arrangements, the surface could simply be a tabletop or support or some other surface for physically supporting the object, with or without means for advancing the object(s) toward the stop(s). Each stop 25 is shown as extending upwardly from a support 29. Each stop is sequentially bounded by, in pertinent part, an upwardly- and leftwardly-inclined surface 30, an uppermost horizontal surface 31, and an upwardly- and rightwardly-inclined surface 32 extending downwardly therefrom and joining a rightwardly-facing vertical surface 33. The function of stops 25 is simply to physically stop objects 21 as they move from left to right along the conveyor.

Each hold-down 26 is fragmentarily illustrated as being a member that is spaced horizontally from the stop by a distance h, and vertically from the surface by a distance y. Each hold-down is mounted on other structure (not shown). The horizontal distance h is operatively arranged such that only the rod at the first location 22 will be completely exposed and available for movement to the second location. The vertical spacing y is operatively arranged such that only one rod may pass from left to right toward the first location.

As best shown in FIG. 1, each mechanism 28 is a vertically-elongated bar-shaped member that is intermediately mounted on an eccentric 34. The lower end of this bar carries a roller 35 that is mounted for controlled movement between a pair of vertically-elongated transversely-spaced guides 36, 36. As best shown in FIG. 2, the uppermost marginal end portion of this bar is specially configured. More particularly, the upper marginal end portion of bar 38 is shown as including a leftwardly-facing vertical surface 39, an upwardly-facing horizontal surface 40, a concave surface 41, an upwardly- and rightwardly-facing inclined surface 42, an upwardly- and leftwardly-facing inclined surface 43, an upwardly-facing horizontal surface 44, and a rightwardly-facing vertical surface 45. The bar is configured and arranged such that as the eccentric mechanism is rotated, surface 40 will orbit around an elliptical path, indicated in phantom at 46.

As best shown in FIGS. 3–6, the device is selectively operable for use with different diameters of such rod-like objects. As used herein, the term "elongated object" does not refer to a particular transverse cross-section. In other words, the object may be a cylindrical rod, a square rod, a tube, or may have any other rounded or polygonal shape as desired.

FIGS. 3–6 illustrate the operation of the device with three different sizes of cylindrical rods. FIG. 3 illustrates the device when used with a ⅜-inch diameter rod and FIG. 4 illustrates the operation of the device with ½-inch diameter rod. FIG. 5 illustrates the device operatively associated with 2-inch diameter rods, and FIG. 6 illustrates the device as being associated with 4-inch diameter rods. In FIG. 3, it should be noted that the smaller rods are received in concave surface 41, and are delivered along elliptical path 46 in a clockwise direction. If the lifting mechanism is positioned between the adjacent lengths of the conveyor, the mechanism may selectively lift the exposed rod in the first location, and selectively deposit it back on the conveyor adjacent the other end of the major axis of the ellipse. However, this is only illustrative, and the second location may be arranged at other locations as well.

In the preferred embodiment, a light source 48 is operatively arranged to sense movement of the rod 21 as it traverses the orbital path from the first location to the second location.

The alternative arrangement shown in FIG. 4 is basically the same, inasmuch as there is not a great dimensional difference between ⅜-inch diameter rod and ½-inch diameter rod.

FIGS. 5 and 6, illustrate the use of the device with 2- and 4-inch rods, respectively. In this arrangement, a 2-inch diameter rod is picked up from the first location, and falls into the crotch between inclined surfaces 42 and 43, and is held in this position as the mechanism moves along the orbit path to the second location. In FIG. 6, the same is true, namely, that the 4-inch diameter rod is again held in the cradle between surfaces 42 and 43 as it is articulated along the orbital path from the first location to the second location.

If desired, the apparatus may be further associated with a separator, generally indicated at 49. This separator is mounted on a carriage 50 that is mounted for movement along a direction generally parallel to the axes of the various objects on conveyor 24. The device is translated in such direction by a motor 51 and a ladder chain 52. The carriage is guided by a pair of rollers, severally indicated at 53, which are mounted within facing channel-shaped tracks 54, 54. The separator has a blade-like member 55,that is arranged to be positioned in the elliptical path. In the disclosed embodiment, this blade-like member 55 is pivotally mounted on the carriage such that it will pivot to an out-of-the-way position about axis 56 when the carriage is moved in one direction. However, this member will pivot in the opposite direction and will abut stops when the carriage is moved in the opposite direction. The function of separator 49 is to physically separate any device that may have become "jackstrawed" or intertwined. It is normally held in an out-of-the-way position, and is only used to selectively straighten intertwined rods.

Referring now to FIGS. 9 and 10, the device may, if desired, incorporate a pre-separator 60. This pre-separator generally includes a motor 61 arranged to rotate a member 62. Objects are feed from left to right along a surface 63, such as a conveyor. The member 62 has a single variable-pitch helically-wound recess, generally indicated at 64. Adjacent its left end, the convolutions 65 are relative close and are generally configured for smaller-diameter rods, such as those that are ⅜-inch in diameter. The rightwardmost of those convolutions then communicates with a next series of convolutions, generally indicated at 66. These are more deep and are adapted to handle ½-inch rod. The rightwardmost of these convolutions then communicates with two more convolutions, severally indicated at 68. These two are of larger radius, and are adapted to specifically handle 1- or 2-inch diameter rods.

The rightwardmost of these convolutions then communications with some additional convolutions, severally indicated at 69, that are of even greater radius. As mentioned before, there is one single continuously helically-wound annular groove from the left to the right end of member 62. However, the pitch between adjacent convolutions varies as describe above. Moreover, as the separator 60 is arranged to be moved vertically upwardly or downwardly relative to surface 63, this being indicated in the direction of the arrows 70.

FIGS. 10–12 indicates the vertical height of the pre-separator relative to the size of rod being handled. If the device is used to separate, say, ⅜-inch diameter rod, the device would be moved to a position such as shown in FIG. 10. Hence, ⅜-inch diameter rods would enter the helix at the left end, and be advanced therealong and discharged from the right end. Note that the spacing between adjacent rods increases as the rods are propelled along the length of the pre-separator.

FIG. 11 illustrates device 60 as having moved vertically downwardly such that a larger rod, say, ½-inch diameter rods, will enter the device at grooves 66. Here again, the rods are advanced rightwardly along the device, and the spacing increases as the rods are moved therealong.

FIG. 12 illustrates yet another arrangement in which the device has been moved further vertically downwardly such that larger diameter rods, say, 1-inch diameter rods, enter the device in grooves 68. Here again, the operation is in all cases the same, but for the entrance location.

FIGS. 10–12 further illustrate a counter 71 arranged to emit an optical beam for physically counting each and every rod as it exits the pre-separator. This pre-separator is arranged to be positioned to engage a one marginal end portion of the rods. As indicated above, the rods may be from twelve to sixty feet in length. Hence, the function here is to physically separate the rods, and to count them individually as they move through the pre-separator. The pre-separator shown in FIGS. 9–12 may be used upstream of the device shown in FIGS. 1 and 2.

Modifications

The present invention contemplates that many changes and modifications may be made. For example, the structure depicted in the various drawings is generally regarded as being schematic to illustrate the fundamental structure and operation of the invention. The shape and configuration of that structure may be readily changed or varied, as desired. It should also be understood that there may be, with respect to the embodiment shown in FIGS. 1–6, multiple stops arranged to operate with a rod. For example, the rods may be on the order of sixty feet in length, and there may be stops arranged about every four feet along their length. The orbital mechanism is arranged between these stops, as are the conveyors that are used to advance the rods toward the first position. The stop need not have necessarily have the frusto-conical tooth-like shape or configuration shown, but may have some other form as well. In the preferred embodiment, the mechanism has a concave 41 adapted to receive smaller-diameter rods, and a larger recess bounded by surfaces 42,43 to receive larger diameters. This is presently preferred, but not invariable. The second location may be at the other end of the major axis of the ellipse, or may be at one of the ends of the minor axis, or at some other position as well. The orbital path may be elliptical, circular, polygonal, or have some other repetitious path as well. The use of the separator 49 is optional. Similarly, the use of the pre-separator 60 is also optional. The materials of construction are not deemed to be particularly critical, and may be readily changed or varied as desired.

Therefore, while the presently-preferred form of the invention has been shown and described, and several modifications thereof discussed, persons skilled in this art will readily appreciate that various additional changes and modifications may be made without departing from the spirit of the invention, as defined and differentiated by the following claims.

What is claimed is:

1. A device adapted to move an elongated object from a first location to a second location, comprising:
   a surface for supporting an object;
   a stop extending in a direction away from said surface;
   a hold-down spaced from said surface and said stop;
   said first location being arranged between said surface, stop and hold-down;
   a mechanism adapted to pick up an object positioned at said first location and to move said object along an orbital path to said second location; and
   a separator adapted to be selectively moved toward said object while said object is on said orbital path, and further adapted to be selectively moved in a longitudinal direction relative to said object to separate one of said objects from another.

2. A device as set forth in claim 1 wherein said orbital path is substantially elliptical.

3. A device as set forth in claim 1 wherein said mechanism has a first concave surface for picking up objects of a relatively-small diameter, and a second concave surface for picking up objects of a relatively-large diameter.

4. A device as set forth in claim 1 wherein said surface is a conveyor.

5. A device as set forth in claim 4 wherein said second location is on said conveyor.

6. A device as set forth in claim 1 and further comprising:
   a counter for counting said object as it moves along said orbital path from said first location to said second location.

7. A device as set forth in claim 6 wherein said counter includes an optical beam.

* * * * *